United States Patent Office 2,842,538
Patented July 8, 1958

2,842,538
POLYAZO DYESTUFFS

Hans-Rudolf Byland, Riehen, near Basel, Switzerland, assignor, by mesne assignments, to Saul & Co., Newark, N. J., as nominee of Fidelity Union Trust Company, executive trustee under Sandoz Trust No Drawing. Application March 14, 1955
Serial No. 494,295

Claims priority, application Switzerland October 20, 1952

7 Claims. (Cl. 260—168)

The present application is a continuation-in-part application of my copending application Serial No. 385,671, filed on October 12, 1953 (and abandoned since the filing of the present application).

The present invention relates to copperable polyazo dyestuffs which dye cotton and fibers of regenerated cellulose by the single bath or after-coppering process in navy blue, gray and black shades of excellent fastness to wet treatments. The fastness to light of the coppering dyeings is also excellent.

The polyazo dyestuffs according to the present invention correspond to the formula

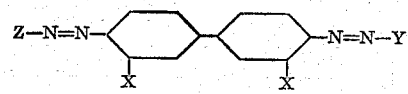

wherein X stands for OH, $OCH_3$, $OC_2H_5$, $OCH_2.COOH$ or COOH, Y stands for a moiety corresponding to the formula

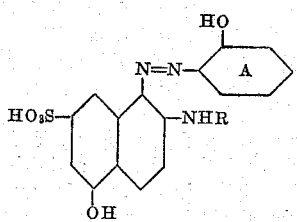

Z stands for the radical of a coupling component corresponding to the aforesaid Formula I or for the radical of a coupling component of the benzene or naphthalene series, R stands for hydrogen, lower alkyl, cycloalkyl, aralkyl or aryl, and the nucleus A is free from carboxylic acid groups but may be otherwise substituted or unsubstituted.

More particularly, the invention is concerned with a group of copperable polyazo dyestuffs which correspond to the formula

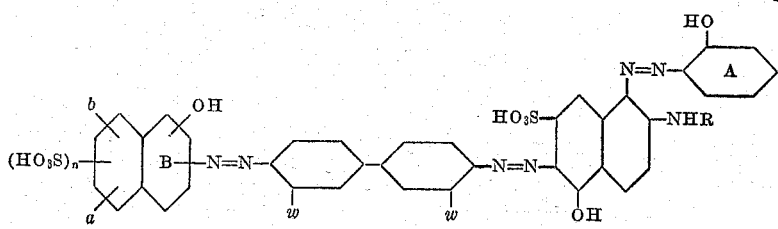

wherein $w$ stands for $OCH_3$ or COOH, $a$ stands for hydrogen or —NHR, $b$ stands for hydrogen or for the radical of the formula

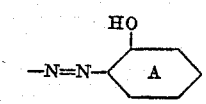

$n$ is one of the numerals 0 and 1, R stands for hydrogen, lower alkyl, cycloalkyl, aralkyl or aryl, nucleus A is free from carboxylic acid groups but may be otherwise substituted or unsubstituted, and wherein —OH in nucleus B is in orthoposition to the adjacent —N=N— group.

The aforesaid dyestuffs are obtained, according to the present invention, by coupling one mol of the tetrazo compound of a 4,4'-diamino-1,1'-diphenyl of the formula

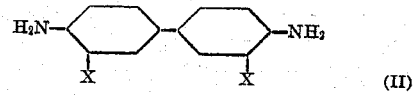

wherein X has the precedingly-indicated significance, with two mols of an azo compound of the formula

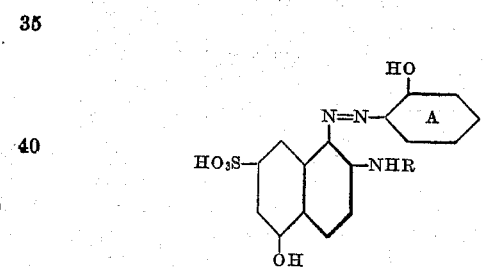

wherein R has the precedingly-indicated significance and nucleus A may be further unsubstituted or may carry substituents other than the carboxyl group, or simultaneously or in any desired order of succession with one mol of an azo compound (III) as hereinbefore described and one mol of a different azo compound corresponding to the said Formula III, or in any desired order of succession with one mol of an azo compound (III) as initially defined and one mol of any other desired azo compound containing one or more groups capable of metal complex formation.

4,4'-diamino-1,1'-diphenyls of the Formula II, which are suitable for preparation of the new polyazo dyestuffs according to the aforesaid processes, comprise 4,4'-diamino-3,3'-dihydroxy-1,1'-diphenyl, 4,4'-diamino-3,3'-dimethoxy-1,1'-diphenyl, 4,4'-diamino-3,3'-diethoxy-1,1'-diphenyl, 4,4'-diamino-3,3'-dicarboxymethoxy-1,1'-diphenyl and 4,4'-diamino-1,1'-diphenyl-3,3'-dicarboxylic acid.

Azo compounds of Formula III can be prepared by coupling diazotized 1-amino-2-hydroxybenzenes with 2-amino-5-hydroxynaphthalene-7-sulfonic acids and N-substituted derivatives thereof, in acid medium. Suitable 1-amino-2-hydroxybenzenes comprise for example 1-amino-2-hydroxybenzene itself, 1-amino-2-hydroxybenzene-4-sulfonic acid, 1-amino-2-hydroxybenzene-5-sulfonic acid, 1-amino-2-hydroxybenzene-5-sulfonic acid amide and its derivatives which are methylated, ethylated, dimethylated and diethylated at the sulfonamide nitrogen, 1-amino-2-hydroxybenzene-5-sulfonic acid - phenylamide and derivatives which are halogenated, alkylated or alkoxylated in the nucleus of the phenylamide group as well as otherwise substituted derivatives such as 1-amino-2-hydroxybenzene-5-sulfonic acid - (3' - carboxy - 4' - hydroxy)-phenylamide, also 1-amino-2-hydroxy-5-chlorobenzene-4-sulfonic acid, 1-amino-2-hydroxy-5-nitrobenzene-4-sulfonic acid, 1-amino-2-hydroxy-3-nitro- or -chloro- or -bromobenzene-5-sulfonic acid and the isomeric compounds wherein the substituents in the 3- and 5-positions are interchanged, 1-amino-2-hydroxy-4-methylsulfonylbenzene, 1 - amino-2-hydroxy-5-methylsulfonylbenzene, 1-amino-2-hydroxy-5-ethylsulfonylbenzene, 1 - amino - 2 - hydroxy - 5 - cyclohexylsulfonylbenzene, 1-amino-2-hydroxy-5-benzylsulfonylbenzene, 1-amino-2-hydroxy-5-phenylsulfonylbenzene, 1-amino - 2 - hydroxy-4-nitrobenzene, 1-amino - 2 - hydroxy - 5 - nitrobenzene, 1-amino-2-hydroxy-5-chlorobenzene, 1-amino-2-hydroxy-3-nitro-5-chlorobenzene, 1 - amino - 2 - hydroxy-4-nitro-5-chlorobenzene, 4,4' - dihydroxy-3-amino-1,1'-azobenzene-3'-carboxylic acid, 4 - hydroxy-3-amino-1,1'-azobenzene-3'-sulfonic acid, etc. Primarily suitable as substituents on the nitrogen of the 2-amino-5-hydroxynaphthalene-7-sulfonic acid are alkyl and cycloalkyl radicals such for example as methyl, ethyl, propyl, hydroxyethyl and cyclohexyl, mononuclear aryl radicals such as phenyl, (2'-methyl)-phenyl, (3'-methyl)-phenyl, (4'-methyl)-phenyl, (3' - chloro) - phenyl, (4' - chloro) - phenyl, (4'-amino)-phenyl, (4' - carboxy) - phenyl, (3'-carboxy-4'-hydroxy)-phenyl, (3'-sulfo)-phenyl and (4'-sulfo)-phenyl, and also binuclear aryl radicals such as (4''-amino)-1',1''-diphenyl as well as aralkyl radicals such as benzyl and the like.

The new polyazo dyestuffs may be symmetrical or unsymmetrical in their structure. For the preparation of unsymmetrical products, the tetrazotized 4,4'-diamino-1,1'-diphenyl (II) is coupled for example with two different azo compounds corresponding to Formula III.

The unsymmetrical polyazo dyestuffs can, however, also be prepared by coupling one mol of tetrazotized compound (II) with one mol of compound (III) and one mol of any other desired azo compound containing one or more groups capable of metal complex formation. Particularly well suited azo components for this purpose are for example 1-hydroxybenzene-2-carboxylic acid, 1-hydroxy-6-methylbenzene - 2 - carboxylic acid, 1 - hydroxynaphthalene-2-carboxylic acid, 2-hydroxynaphthalene-3-carboxylic acid, 1-hydroxynaphthalene-4-sulfonic acid, 1-hydroxynaphthalene-4-sulfonic acid amide, 2-hydroxynaphthalene, 2-hydroxynaphthalene-4- or -6- or -7- or -8-sulfonic acid, the corresponding sulfonic acid amides and methylsulfones, 1 - amino - 5-hydroxynaphthalene-7-sulfonic acid, 2-amino-5-hydroxynaphthalene-7-sulfonic acid, 1 - phenylamino - 5 - hydroxynaphthalene-7-sulfonic acid, 2 - phenylamino - 5 - hydroxynaphthalene-7-sulfonic acid, 2 - methylamino - 5 - hydroxynaphthalene-7-sulfonic acid, 2-ethylamino-5-hydroxynaphthalene-7-sulfonic acid, 2-(4'-hydroxy-3'-carboxy)-phenylamino-5 - hydroxynaphthalene-7-sulfonic acid, 2 - phenylamino-5-hydroxynaphthalene-7,4'-disulfonic acid, 2 - acetylamino - 5 - hydroxynaphthalene-7-sulfonic acid, 2-benzoylamino-5-hydroxynaphthalene-7-sulfonic acid, 2 - amino - 8 - hydroxynaphthalene-6-sulfonic acid, 2-benzoylamino-8-hydroxynaphthalene-6-sulfonic acid, 2-methylamino-8-hydroxynaphthalene-6-sulfonic acid, 2-hydroxyethylamino-8-hydroxynaphthalene - 6 - sulfonic acid, 1-amino-8-hydroxynaphthalene-4-sulfonic acid, 1-amino-8-hydroxynaphthalene-2,4-disulfonic acid, 1 - amino-8-hydroxynaphthalene-3,6-disulfonic acid and 2-butylamino-8-hydroxynaphthalene-3,6-disulfonic acid.

In the production of symmetrical dyestuffs, the one mol of tetrazo compound of 4,4'-diamino-1,1'-diphenyl (II) is coupled simultaneously with the two mols of azo compound (III). If unsymmetrical dyestuffs are being prepared, the tetrazo compound of (II) may be coupled either first with one mol of an azo compound (III) and then with one mol of an azo compound (III) different from the first-mentioned one, or the tetrazo compound is first coupled with one mol of compound (III) and then with any desired other azo component, it being possible in this connection to reverse the procedure and carry out the coupling first with the last-mentioned azo component. Valuable products can also be obtained with the simultaneous coupling of the tetrazo compound with a mixture of two different azo compounds (III). The first coupling generally takes place fairly rapidly and is advantageously carried out in a medium rendered alkaline with sodium carbonate. The resultant intermediate is either isolated or is further employed in solution without special working up. In order to accelerate the second coupling, it is desirable to add to the reaction solution an organic tertiary base, such as pyridine, quinoline or a technical pyridine base mixture. If the tetrazotized 4,4'-diamino-1,1'-diphenyl is coupled simultaneously with both azo components, which may be the same or different from each other, the organic tertiary base which has an accelerating action is added to the coupling mass immediately at the beginning of the reaction.

The resulting polyazo dyestuffs are, if desired, salted out of the reaction solution, filtered and dried. The dyestuffs are readily soluble in water and may be employed for dyeing by the single bath or by the after-coppering process. A particularly valuble aftertreatment is that carried out with a salt of bivalent copper in the presence of a polymeric substance containing an imino or amino group, as for example those disclosed in U. S. Patent No. 2,622,075 of December 16, 1952.

The following examples set forth representative examplary embodiments of the invention. In these examples, the parts are by weight and the temperatures are in degrees centigrade.

*Example 1*

24.4 parts of 4,4'-diamino-3,3'-dimethoxy-1,1'-diphenyl are tetrazotized. To the resultant tetrazo solution, there is added at 0–2° an alkaline solution of 51.5 parts of monoazo compound, obtained by the acid coupling of diazotized 1-amino-2-hydroxybenzene-5-sulfonic acid with 2 - phenylamino - 5 - hydroxynaphthalene - 7 - sulfonic acid, and 10 parts of sodium carbonate in 1000 parts of water. After the addition to the reaction mass of a solution of 50 parts of sodium carbonate in 250 parts of water, the coupling on one side takes place rapidly and the formed intermediate is completely precipitated. As soon as the tetrazo compound has entirely disappeared, the reaction mass is combined with a solution of 15.2 parts of 2-hydroxynaphthalene, 4 parts of sodium hydroxide and 300 parts of water. After stirring for several hours, the formation of the trisazo dyestuff is complete; it is salted out with sodium chloride, and then filtered and dried. It corresponds to the formula 8-hydroxynaphthalene-6-sulfonic acid, 10 parts of sodium carbonate and 100 parts of pyridine in 600 parts of water and the resultant mass stirred for several hours at room temperature. The precipitated intermediate is isolated by filtration, introduced into a solution of 43.8 parts of the monoazo compound, obtained by the acid coupling of diazotized 1-amino-2-hydroxybenzene-5-sulfonic acid amide with 2-amino-5-hydroxynaphthalene-7-sulfonic acid, 4 parts of sodium hydroxide and 200 parts of pyridine in 1000 parts of water, after which the mass is stirred for several hours at 30°. The formed trisazo

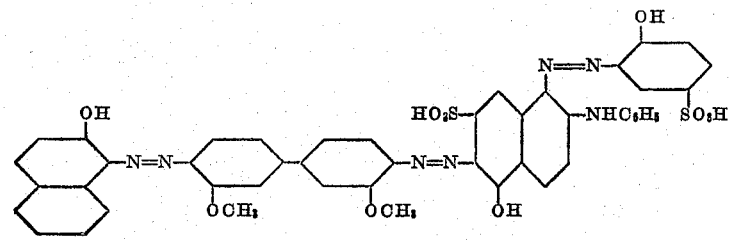

and is a dark bronzy powder which dissolves with dark blue coloration in water and dyes cotton and fibers of dyestuff is precipitated, filtered and dried. It corresponds to the formula

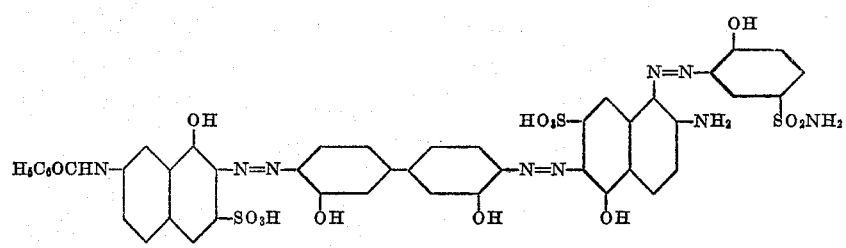

regenerated cellulose in navy blue shades. By treatment with copper sulfate by the one- or two-bath process, the dyeings are deepened and imparted a very good fastness to wet treatments.

By replacing the 2-phenylamino-5-hydroxynaphthalene-7-sulfonic acid used in making the monoazo compound by 2-amino-5-hydroxynaphthalene-7-sulfonic acid or by 2-methyl-amino-5-hydroxynaphthalene-7-sulfonic acid or by 2-hydroxyethylamino-5-hydroxynaphthalene-7-sulfonic acid or by 2-ethylamino-5-hydroxynaphthalene-7-sulfonic acid or by 2-propylamino-5-hydroxynaphthalene-7-sulfonic acid or by 2-cyclohexylamino-5-hydroxynaphthalene-7-sulfonic acid or by 2-benzylamino-5-hydroxynaphthalene-7-sulfonic acid or by 2-(3'-carboxy-4'-hydroxy)-phenylamino-5-hydroxynaphthalene-7-sulfonic acid, and otherwise proceeding as described in the preceding paragraph, there is in each case obtained a dyestuff with properties similar to those of the dyestuff obtained according to the said paragraph.

Example 2

21.6 parts of 4,4'-diamino-3,3'dihydroxy-1,1'-diphenyl are tetrazotized. The isolated tetrazo compound is introduced into a solution of 34.3 parts of 2-benzoylaminoand is a dark powder which dissolves with blue coloration in water and dyes cotton and fibers of regenerated cellulose by the after-coppering process in blue shades which are characterized by noteworthy fastness to wet treatments and to light.

Dyestuffs with similar properties are obtained when, in the foregoing, the 2-benzoylamino-8-hydroxy-naphthalene-6-sulfonic acid is replaced by the corresponding quantity of 1-hydroxynaphthalene-4-sulfonic acid or 2-hydroxynaphthalene-4-sulfonic or 2-hydroxynaphthalene-6-sulfonic acid or 1-amino-8-hydroxynaphthalene-4-sulfonic acid or 1-amino-5-hydroxynaphthalene-7-sulfonic acid or 2-benzoylamino-5-hydroxynaphthalene-7-sulfonic acid.

Example 3

24.4 parts of 4.4'-diamino-3,3'-dimethoxy-1,1'-diphenyl are tetrazotized and then coupled with 20.7 parts of 1-hydroxybenzene-2-carboxylic acid in aqueous solution and in presence of sodium carbonate. After stirring for several hours, the formation of the intermediate is complete; the intermediate is then coupled in the presence of pyridine with 43.8 parts of the monoazo compound, obtained by the acid coupling of diazotized 1-amino-2-hydroxybenzene-5-sulfonic acid amide with 2-phenylamino- 5-hydroxynaphthalene-7-sulfonic acid, in aqueous solution. The trisazo dyestuff which is produced is precipitated, filtered and dried. It corresponds to the formula

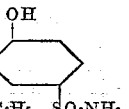
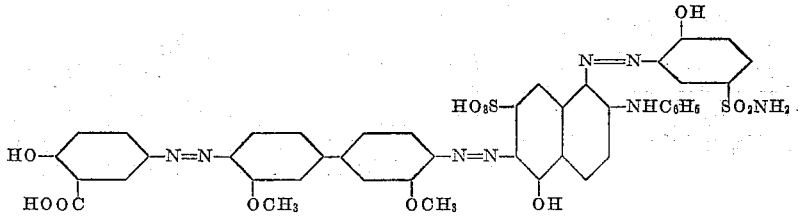

and is a dark bronzy powder which dissolves with a violet-black coloration in water and dyes cotton and fibers of regenerated cellulose in bluish black shades, which in the coppered state have noteworthy fastness properties.

Dyestuffs with similar properties are obtained when, in preparing the monoazo compound, referred to in the preceding paragraph, the 1-amino-2-hydroxybenzene-5-sulfonic acid amide is replaced by 1-amino-2-hydroxybenzene-5-sulfonic acid or 1-amino-2-hydroxybenzene-5-sulfonic acid-methylamide or 1-amino-2-hydroxybenzene-5-sulfonic acid-phenylamide or 1-amino-2-hydroxy-4-nitrobenzene or 1-amino-2-hydroxy-5-nitrobenzene or 1-amino-2-hydroxy-5-chlorobenzene.

*Example 4*

24.4 parts of 4,4'-diamino-3,3'-dimethoxy-1,1'-diphenyl are tetrazotized. The tetrazo solution is then added, in the presence of pyridine, to an aqueous solution, rendered alkaline with sodium carbonate, of 95.2 parts of a mixture of monoazo compounds, which mixture is obtained by the acid coupling of one mol of diazotized 1-amino-2-hydroxybenzene-5-sulfonic acid amide with a mixture of 0.5 mol of 2-amino-5-hydroxynaphathalene - 7 - sulfonic acid and 0.5 mol of 2-phenylamino-5-hydroxynaphthalene-7-sulfonic acid. The thus-obtained tetrakisazo dyestuff is salted out with sodium chloride, filtered and dried. It corresponds to the formula

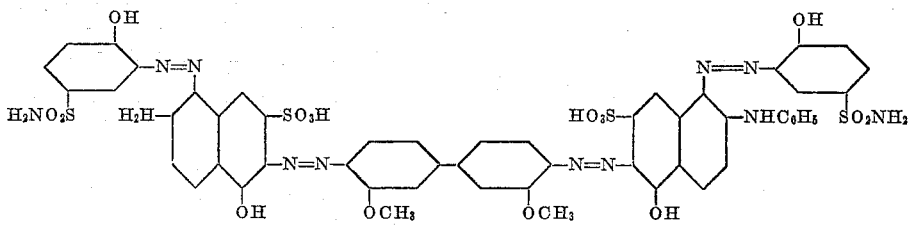

and is a dark powder which dissolves with blue coloration in water and dyes cotton and fibers of regenerated cellulose in navy blue shades. The coppered dyeings possess outstanding fastness properties.

A whole series of additional tetrakisazo dyestuffs can be obtained according to the above-described mode of procedure, either by changing the proportions of 2-amino-5-hydroxynaphathalene-7-sulfonic acids used in preparing the monoazo compound mixture or by replacing one or both components by one of the naphthalene compounds enumerated in Example 1 and different from the naphthalene compounds mentioned in the preceding paragraph, or by replacing the diazotized 1-amino-2-hydroxybenzene-5-sulfonic acid amide by the diazo compound of one of the amines mentioned in Example 3, or finally by replacing the 4,4'-diamino-3,3'-dimethoxy-1,1'-diphenyl by another diamine which contains in the 3,3'-positions substituents which are capable of metal complex formation. Such diamines comprise 4,4'-diamino-3,3'-dicarboxymethoxy-1,1'-diphenyl, 4,4' - diamino-1,1'-diphenyl-3,3'-dicarboxylic acid, 4,4'-diamino-3,3'-dihydroxy - 1,1' - diphenyl and 4,4'-diamino-3,3'-diethoxy-1,1'-diphenyl.

*Example 5*

24.4 parts of 4,4'-diamino-3,3'-dimethoxy-1,1'-diphenyl are tetrazotized. The tetrazo solution is combined, in the presence of sodium carbonate, with a solution of 47.3 parts of the monoazo compound, obtained by the acid coupling of the diazotized 1-amino-2-hydroxy-5-chlorobenzene-3-sulfonic acid with 2-amino-5-hydroxynaphthalene-7-sulfonic acid, in 1000 parts of water. Upon completion of the formation of the intermediate, there is added to the coupling mixture a solution of 40.3 parts of the monoazo compound, obtained by the acid coupling of diazotized 2-hydroxy-5-aminobenzene - 1 - carboxylic acid with 2-phenylamino-5 - hydroxynaphthalene - 7 - sulfonic acid, 10 parts of sodium carbonate, 200 parts of pyridine and 100 parts of water. The tetrakisazo dyestuff, which is thus formed and then isolated, corresponds to the formula

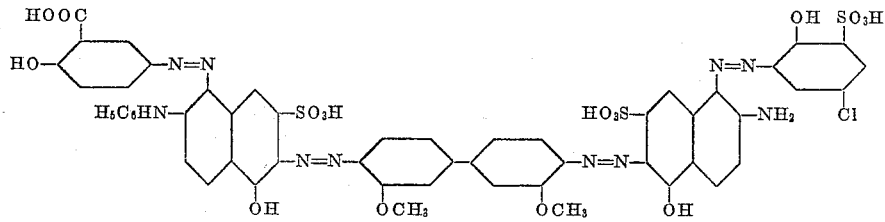

and is a dark powder; it dissolves with blue coloration in water and dyes cotton and fibers of regenerated cellulose in blackish blue shades, which in the coppered state, possess noteworthy fastness properties.

Further examples are summarized in the following table. The coupling of the 4,4'-diamino-1,1'-diphenyl with the two azo components is carried out according to the precedingly-described process. The first coupling is advantageously carried out in a medium rendered alkaline with sodium carbonate and the second may be carried out with the addition of for example pyridine, quinoline or a technical pyridine base mixture. The two couplings may be carried out simultaneously, in which event an organic tertiary base is advantageously added to the coupling mass at the very beginning in order to accelerate the reaction.

| (1) Ex. | (2) 4,4'-diamino-1,1'-diphenyl (II) | (3) Monoazo compound (III) | | (4) Second azo component | (5) Shade of coppered dyeings on cellulose fibers |
|---|---|---|---|---|---|
| | | (a) —R | (b) HO—⬡—radical | | |
| 6 | 4,4'-diamino-3,3'-dimethoxy-1,1'-diphenyl. | —H | 1-amino-2-hydroxy-5-nitrobenzene | 2-hydroxynaphthalene-4-sulfonic acid | Greenish navy blue. |
| 7 | ...do... | —H | ...do... | 2-hydroxynaphthalene-6-sulfonic acid | Reddish navy blue. |
| 8 | ...do... | —$C_6H_5$ | ...do... | 1-hydroxynaphthalene-4-sulfonic acid | Do. |
| 9 | ...do... | —H | 1-amino-2-hydroxybenzene-5-sulfonic acid. | 2-hydroxynaphthalene | Navy blue. |
| 10 | ...do... | —H | ...do... | 2-hydroxynaphthalene-6-sulfonic acid | Reddish navy blue. |
| 11 | ...do... | —H | 1-amino-2-hydroxy-5-nitrobenzene-3-sulfonic acid. | 2-hydroxynaphthalene | Navy blue. |
| 12 | ...do... | —$C_6H_5$ | ...do... | 2-hydroxynaphthalene-4-sulfonic acid | Greenish navy blue. |
| 13 | ...do... | —$C_6H_5$ | 1-amino-2-hydroxybenzene-5-sulfonic acid-methylamide. | 1-amino-2-hydroxybenzene-5-sulfonic acid-methylamide ⟶ 2-amino-5-hydroxynaphthalene-7-sulfonic acid. | Reddish navy blue. |
| 14 | ...do... | —$C_6H_5$ | 1-amino-2-hydroxy-5-chlorobenzene-3-sulfonic acid. | 1-amino-4-hydroxybenzene-3-carboxylic acid ⟶ 2-phenylamino-5-hydroxynaphthalene-7-sulfonic acid. | Black-blue. |
| 15 | ...do... | —$C_6H_5$ | 1-amino-2-hydroxy-3-chlorobenzene-5-sulfonic acid. | 2-hydroxynaphthalene-6-sulfonic acid | Navy blue. |
| 16 | ...do... | —H | 1-amino-2-hydroxybenzene-5-sulfonic acid-phenylamide. | 1-amino-2-hydroxybenzene-5-sulfonic acid-methylamide ⟶ 2-phenylamino-5-hydroxynaphthalene-7-sulfonic acid. | Do. |
| 17 | ...do... | —$CH_2CH_2OH$ | ...do... | 2,4-dihydroxynaphthalene | Do. |
| 18 | ...do... | —$C_6H_5$ | 1-amino-2-hydroxybenzene-5-sulfonic acid amide. | 2-hydroxyethylamino-8-hydroxynaphthalene-6-sulfonic acid. | Blue-gray. |
| 19 | ...do... | —$C_6H_4.OH$ | ...do... | 1-hydroxy-6-methylbenzene-2-carboxylic acid. | Reddish black. |
| 20 | ...do... | —$C_6H_4.SO_3H$ | ...do... | 1-hydroxy-4-methylbenzene | Do. |
| 21 | ...do... | —⬡—OH, COOH | 1-amino-2-hydroxy-5-chlorobenzene-3-sulfonic acid. | 1-amino-2-hydroxy-5-chlorobenzene-3-sulfonic acid ⟶ 2-(3'-carboxy-4'-hydroxy)-phenylamino-5-hydroxynaphthalene-7-sulfonic acid. | Navy blue. |
| 22 | 4,4'-diamino-3,3'-dihydroxy-1,1'-diphenyl. | —$C_6H_5$ | 1-amino-2-hydroxybenzene-5-sulfonic acid amide. | 1-amino-2-hydroxybenzene-5-sulfonic acid amide ⟶ 2-phenylamino-5-hydroxynaphthalene-7-sulfonic acid. | Blue. |
| 23 | 4,4'-diamino-1,1'-diphenyl-3,3'-dicarboxylic acid. | —$C_6H_5$ | ...do... | ...do... | Reddish navy blue. |
| 24 | 4,4'-diamino-3,3'-dimethoxy-1,1'-diphenyl. | —$C_6H_4.Cl$ | ...do... | 2-phenylamino-5-hydroxynaphthalene-7-sulfonic acid. | Do. |
| 25 | ...do... | —H | 1-amino-2-hydroxy-4-nitrobenzene | 2-(3'-carboxy-4'-hydroxy)-phenylamino-5-hydroxynaphthalene-7-sulfonic acid. | Navy blue. |
| 26 | ...do... | —$C_6H_5$ | 1-amino-2-hydroxy-3-chlorobenzene-5-sulfonic acid. | 2-acetylamino-5-hydroxynaphthalene-7-sulfonic acid. | Do. |
| 27 | ...do... | —$C_6H_5$ | 1-amino-2-hydroxybenzene-5-sulfonic acid amide. | 1-amino-8-hydroxynaphthalene-4-sulfonic acid. | Do. |
| 28 | ...do... | —$C_6H_5$ | 1-amino-2-hydroxy-4-nitrobenzene | 1-benzoylamino-8-hydroxynaphthalene-3,6-disulfonic acid. | Do. |
| 29 | ...do... | —$C_6H_5$ | 1-amino-2-hydroxy-3-nitro-5-chlorobenzene. | 1-hydroxynaphthalene-4-sulfonic acid. | Do. |
| 30 | 4,4'-diamino-3,3'-dicarboxymethoxy-1,1'-diphenyl. | —$C_6H_5$ | 1-amino-2-hydroxybenzene-5-sulfonic acid. | 1-phenylamino-5-hydroxynaphthalene-7-sulfonic acid. | Gray-blue. |
| 31 | 4,4'-diamino-3,3'-dimethoxy-1,1'-diphenyl. | —$C_6H_5$ | ...do... | 2-(4''-amino-1',1''-diphenyl)-amino-8-hydroxynaphthalene-6-sulfonic acid. | Reddish gray. |
| 32 | 4,4'-diamino-3,3'-diethoxy-1,1'-diphenyl. | —H | ...do... | 2-hydroxynaphthalene-3-carboxylic acid. | Navy blue. |
| 33 | 4,4'-diamino-3,3'-dicarboxymethoxy-1,1'-diphenyl. | —$C_6H_5$ | 1-amino-2-hydroxybenzene-5-sulfonic acid-phenylamide. | 1-amino-2-hydroxybenzene-5-sulfonic acid amide ⟶ 2-phenylamino-5-hydroxynaphthalene-7-sulfonic acid. | Do. |
| 34 | ...do... | —$C_6H_5$ | 1-amino-2-hydroxybenzene-5-sulfonic acid amide. | 2-hydroxynaphthalene | Do. |
| 35 | 4,4'-diamino-1,1'-diphenyl-3,3'-dicarboxylic acid. | —$C_6H_5$ | 1-amino-2-hydroxybenzene-5-sulfonic acid-methylamide. | ...do... | Reddish navy blue. |
| 36 | ...do... | —H | 1-amino-2-hydroxy-5-nitrobenzene | 1-amino-2-hydroxy-5-nitrobenzene acid ⟶ 2-amino-5-hydroxynaphthalene-7-sulfonic acid. | Navy blue. |
| 37 | ...do... | —H | 1-amino-2-hydroxy-3-nitro-5-chlorobenzene. | 1-amino-2-hydroxy-3-nitro-5-chlorobenzene acid ⟶ 2-amino-5-hydroxynaphthalene-7-sulfonic acid. | Do. |
| 38 | ...do... | —H | 1-amino-2-hydroxy-4-nitro-5-chlorobenzene. | 1-amino-2-hydroxy-4-nitro-5-chlorobenzene acid ⟶ 2-amino-5-hydroxynaphthalene-7-sulfonic acid. | Do. |

| (1) | (2) | (3) Monoazo compound (III) | | (4) | (5) |
|---|---|---|---|---|---|
| Ex. | 4,4'-diamino-1,1'-diphenyl (II) | (a) —R | (b) HO—⟨⟩—radical | Second azo component | Shade of coppered dyeings on cellulose fibers |
| 39 | 4,4'-diamino-3,3'-dimethoxy-1,1'-diphenyl. | —H | 1-amino-2-hydroxy-3-nitro-5-chlorobenzene. | 2-hydroxynaphthalene-4-sulfonic acid. | Navy blue. |
| 40 | ____do____ | —H | 1-amino-2-hydroxy-4-nitrobenzene-5-sulfonic acid. | 2-hydroxynaphthalene | Do. |
| 41 | ____do____ | —C₆H₅ | 1-amino-2-hydroxy-3-nitro-5-chlorobenzene. | 1-hydroxybenzene-2-carboxylic acid. | Black. |
| 42 | ____do____ | —C₆H₅ | 1-amino-2-hydroxy-4-nitro-5-chlorobenzene. | ____do____ | Do. |
| 43 | ____do____ | —CH₃ | 1-amino-2-hydroxybenzene-5-sulfonic acid. | 2-hydroxynaphthalene | Navy blue. |
| 44 | ____do____ | —C₂H₅ | ____do____ | ____do____ | Do. |
| 45 | ____do____ | —C₃H₇ | ____do____ | ____do____ | Do. |
| 46 | ____do____ | —C₆H₁₁ | ____do____ | ____do____ | Do. |
| 47 | ____do____ | —CH₂.C₆H₅ | ____do____ | ____do____ | Do. |
| 48 | ____do____ | —⟨⟩—OH, COOH | ____do____ | ____do____ | Do. |
| 49 | ____do____ | —C₆H₅.CH₃ | 1-amino-2-hydroxy-4-methylsulfonylbenzene. | ____do____ | Do. |
| 50 | ____do____ | —C₆H₅ | 1-amino-2-hydroxy-5-methylsulfonylbenzene. | 1-amino-2-hydroxy-5-methylsulfonylbenzene ⟶ 2-phenylamino-5-hydroxynaphthalene-7-sulfonic acid. | Do. |
| 51 | 4,4'-diamino-1,1'-diphenyl-3,3'-dicarboxylic acid. | —C₆H₅ | ____do____ | ____do____ | Do. |
| 52 | ____do____ | —CH₂.C₆H₅ | 1-amino-2-hydroxy-5-ethylsulfonylbenzene. | ____do____ | Do. |
| 53 | ____do____ | —C₆H₁₁ | 1-amino-2-hydroxy-5-butylsulfonylbenzene. | ____do____ | Do. |
| 54 | ____do____ | —C₂H₅ | 1-amino-2-hydroxy-5-cyclohexylsulfonylbenzene. | ____do____ | Do. |
| 55 | ____do____ | —CH₃ | 1-amino-2-hydroxy-5-benzylsulfonylbenzene. | ____do____ | Do. |
| 56 | ____do____ | —H | 1-amino-2-hydroxy-5-phenylsulfonylbenzene. | ____do____ | Do. |
| 57 | ____do____ | —H | 1-amino-2-hydroxy-5-(4'-methyl)-phenylsulfonylbenzene. | ____do____ | Do. |
| 58 | ____do____ | —C₆H₅ | 1-amino-2-hydroxybenzene-5-sulfonic acid-ethylamide. | 1-amino-2-hydroxybenzene-5-sulfonic acid amide ⟶ 2-phenylamino-5-hydroxynaphthalene-7-sulfonic acid. | Do. |
| 59 | ____do____ | —H | 1-amino-2-hydroxybenzene-4-sulfonic acid-dimethylamide. | ____do____ | Do. |
| 60 | ____do____ | —H | 1-amino-2-hydroxybenzene-5-sulfonic acid-cyclohexylamide. | ____do____ | Do. |
| 61 | ____do____ | —H | 1-amino-2-hydroxybenzene-5-sulfonic acid-benzylamide. | ____do____ | Do. |
| 62 | ____do____ | —H | 1-amino-2-hydroxybenzene-5-sulfonic acid-(4'-methyl)-phenylamide. | ____do____ | Do. |
| 63 | ____do____ | —H | 1-amino-2-hydroxybenzene-5-sulfonic acid-diethylamide. | ____do____ | Do. |

Representative dyestuffs set forth in the preceding table follow:

*Example 7*

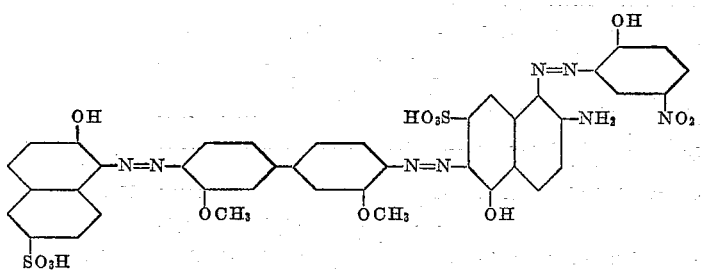

Example 8

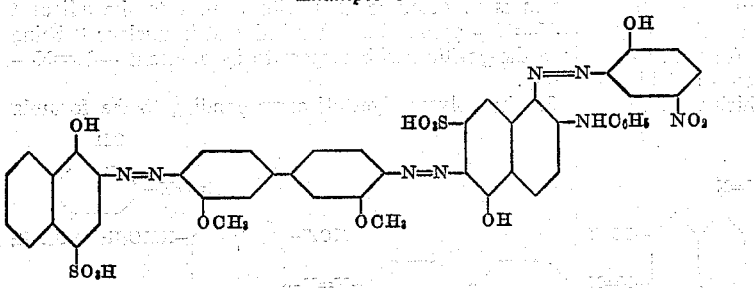

Example 23

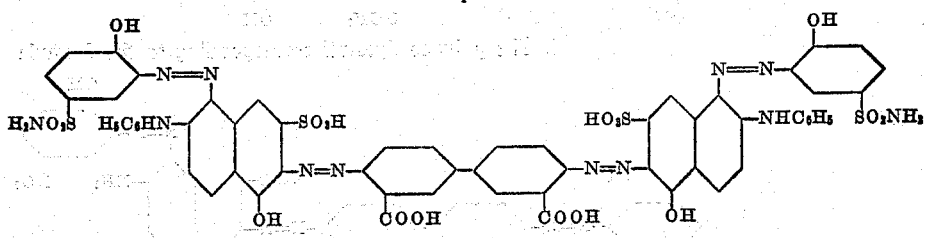

Example 51

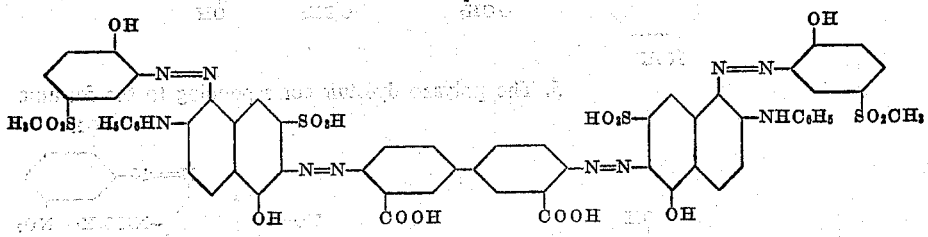

Example 64

10 parts of pre-wetted cotton are introduced into 300 parts of water at 40°. A concentrated aqueous solution containing 0.6 part of a dyestuff of any one of the foregoing examples is then added to the bath, which is then heated to boiling within 30 minutes. In the course of the heating, there are added to the dye bath, in small portions, 3 parts of sodium sulfate in the form of a concentrated aqueous solution. The bath is then maintained at boiling for an additional 30 minutes, 1 part of sodium sulfate is added, and the bath then allowed to cool slowly to 40°. The dyed material is then thoroughly rinsed and introduced into a fresh bath consisting of 300 parts of water, 0.3 part of acetic acid and 0.3 part of copper sulfate, wherein it is treated for 30 minutes at 70°. The resultant metallized dyeing is rinsed and dried.

The 0.3 part of copper sulfate of the aftertreatment bath mentioned in the preceding paragraph may be replaced by 0.3 part of a copper complex compound of the condensation product of diethylenetriamine and dicyandiamide (obtainable according to the process of U. S. Patent No. 2,622,075 of December 16, 1952).

Having thus disclosed the invention, what is claimed is:
1. A polyazo dyestuff which corresponds to the formula

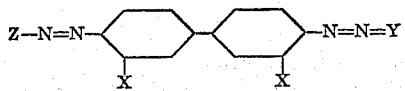

wherein X stands for a member selected from the group consisting of OH, $OCH_3$, $OC_2H_5$, $OCH_2.COOH$ and COOH, Y stands for a moiety corresponding to the formula

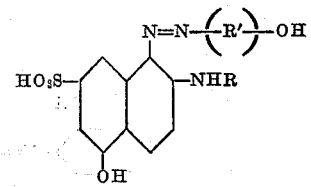

R' representing a member selected from the group consisting of mono- and bi-nuclear aryl radicals of the benzene series which are free from carboxylic acid groups and the OH substituent of which is in ortho-position with respect to the adjacent —N=N— group, Z stands for a member selected from the group consisting of coupling components of the benzene and naphthalene series, wherein Y and Z may be identical, and wherein R stands for a member selected from the group consisting of hydrogen, lower alkyl, lower hydroxyalkyl, mononuclear carbocyclic aryl, cyclohexyl and benzyl.

2. A polyazo dyestuff which corresponds to the formula

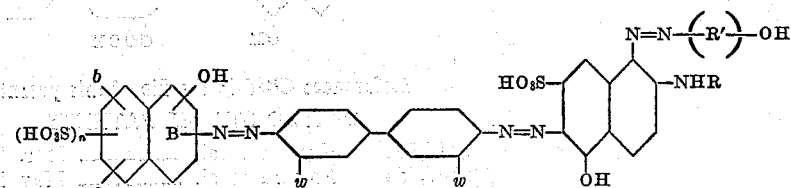

wherein w stands for a member selected from the group consisting of $OCH_3$ and COOH, a stands for a member selected from the group consisting of hydrogen, $NH_2$, —NH.lower alkyl, —NH.cycloalkyl, —NH.aralkyl and NH.aryl, b stands for a member selected from the group consisting of hydrogen and radicals of the formula

—N=N(R')OH $n$ is one of the numerals 0 and 1, R stands for a member selected from the group consisting of hydrogen, lower alkyl, lower hydroxyalkyl, mononuclear carbocyclic aryl, cyclohexyl, and benzyl, and wherein R' stands for a member selected from the group consisting of mono- and binuclear aryl radicals of the benzene series which are free from carboxylic acid groups and the OH substituent of which is in ortho-position with respect to the adjacent —N=N— group, the OH substituent in nucleus B being in ortho-position with respect to its adjacent —N=N— group.

3. The polyazo dyestuff corresponding to the formula

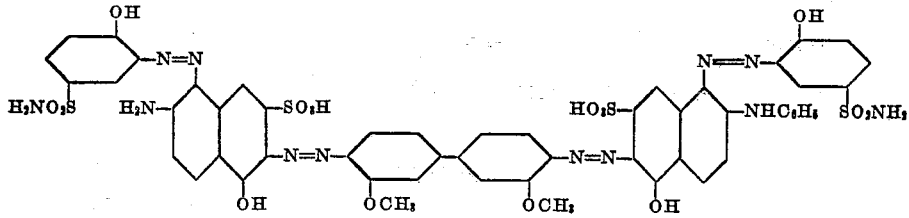

4. The polyazo dyestuff corresponding to the formula

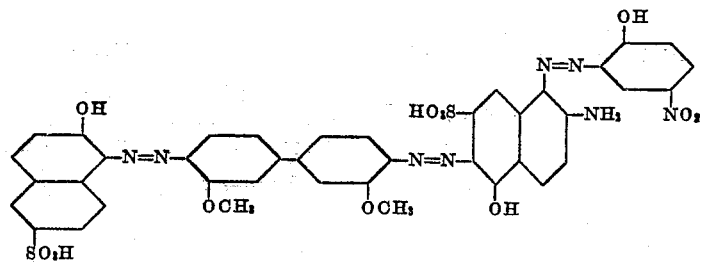

5. The polyazo dyestuff corresponding to the formula

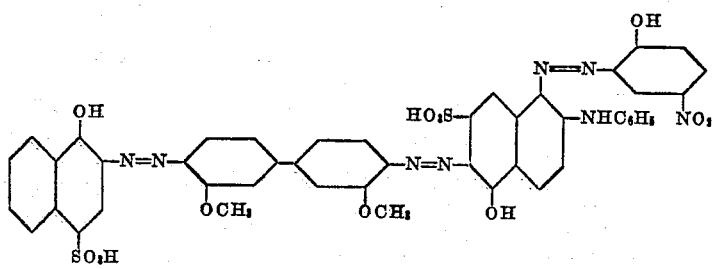

6. The polyazo dyestuff corresponding to the formula

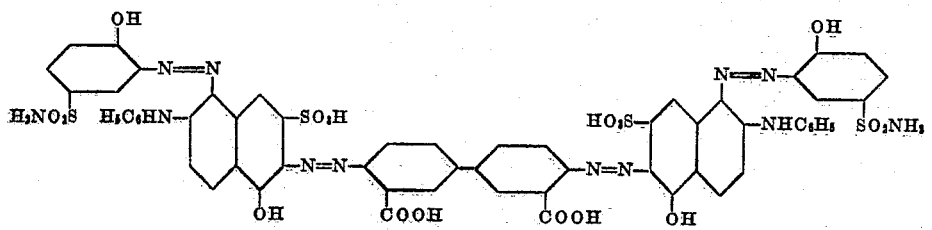

7. The polyazo dyestuff corresponding to the formula

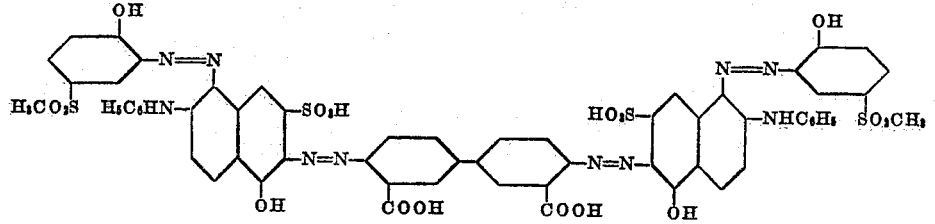

References Cited in the file of this patent

UNITED STATES PATENTS

| | | |
|---|---|---|
| 2,417,306 | Krebser et al. | Mar. 11, 1947 |
| 2,507,754 | Bossard et al. | May 16, 1950 |
| 2,638,468 | Wehrli | May 12, 1953 |
| 2,644,812 | Ruckstuhl et al. | July 7, 1953 |
| 2,710,859 | Kehrer et al. | June 14, 1955 |
| 2,779,755 | Ruckstuhl et al. | Jan. 29, 1957 |

UNITED STATES PATENT OFFICE

CERTIFICATE OF CORRECTION

Patent No. 2,842,538                                             July 8, 1958

Hans-Rudolf Byland

It is hereby certified that error appears in the printed specification of the above numbered patent requiring correction and that the said Letters Patent should read as corrected below.

Column 2, lines 36 to 44, to the right of the formula appearing between those lines, at line 44, add --(III)-- as the number of the formula; column 7, lines 37 and 70, for "hydroxynaphåthalene", each occurrence, read -- hydroxynaphthalene --; same column 7, in the formula of Example 4, left-hand portion, for "$H_2H$-" read -- $H_2N$- --.

Signed and sealed this 3rd day of March 1959.

(SEAL)
Attest:

KARL H. AXLINE
Attesting Officer

ROBERT C. WATSON
Commissioner of Patents